United States Patent [19]
Takahara et al.

[11] 4,017,892
[45] Apr. 12, 1977

[54] VIDEO INFORMATION REPRODUCTION CIRCUITRY HAVING DROP-OUT COMPENSATION CIRCUIT

[75] Inventors: Ichiro Takahara, Kadoma; Yoshiharu Toyoshima, Katano; Yuzo Yamamoto, Hirakata, all of Japan

[73] Assignee: Sanyo Electric Co., Ltd., Osaka, Japan

[22] Filed: Mar. 5, 1976

[21] Appl. No.: 664,388

[30] Foreign Application Priority Data

Mar. 5, 1975 Japan .............................. 50-27466

[52] U.S. Cl. .................................. 358/8; 358/128; 360/38
[51] Int. Cl.² ........................................ H04N 5/76
[58] Field of Search ................. 358/8; 178/6.6 DC; 360/38

[56] References Cited
UNITED STATES PATENTS

| | | |
|---|---|---|
| 3,679,814 | 7/1972 | Barclay .................................. 358/8 |
| 3,912,858 | 10/1975 | Kenney ............................ 360/38 X |
| 3,952,326 | 4/1976 | Rotter .................................. 358/8 |
| 3,969,759 | 7/1976 | Amery .................................. 358/8 |

Primary Examiner—Howard W. Britton
Assistant Examiner—Mitchell Saffian
Attorney, Agent, or Firm—Armstrong, Nikaido & Wegner

[57] ABSTRACT

A video information reproduction circuitry for use in a video disc player of a type utilizing a combination of a scanning transducer and a flexible foil-type disc record having at least one surface formed with a spirally extending information-carrier groove in which the scanning transducer is slidingly engaged during reproduction of video information, is provided with a drop-out compensation circuit for substantially avoiding a possibility of color streaks and black and white dots, which may otherwise occur on a picture tube.

3 Claims, 6 Drawing Figures

VIDEO INFORMATION REPRODUCTION CIRCUITRY HAVING DROP-OUT COMPENSATION CIRCUIT

The present invention generally relates to a color video signal reproducing circuitry employed in a video disc player of a type utilizing a combination of a flexible foil-type video disc having at least one surface formed with a spirally extending information-carrier groove in which the transducer is slidingly engaged during reproduction of video and/or audio information.

More particularly, the present invention pertains to the color video signal reproducing circuitry having a signal drop-out compensation circuit for substantially avoiding a possibility of color streaks and black and white dots, which have often been observed as occurring in the horizontal direction of the reproduced picture on a color picture tube.

The terms "drop-out" referred to hereinabove and hereinafter is to be understood as meaning a substantial failure to pick up video and/or audio information recorded on the video disc and, consequently, a temporal interruption of an output signal from the transducer being engaged in the information-carrier groove of the video disc.

It is well known that, during manufacture of information-recorded video discs to be eventually reproduced by a video disc player through a picture tube either built in said video disc player or provided in a color television receiver to which said video disc player is electrically coupled, color signals are recorded on the information-carrier groove after having been frequency-modulated sequentially and in line-by-line fashion, that is, trisequentially, into a low frequency range, for example, up to about 500 KHz, of a broad band luminance signal. Accordingly, when the information recorded on the video disc in the above described trisequential technique is to be reproduced by means of a reproducing circuitry of the video disc player of the type referred to above, which circuitry is hereinafter referred to as a 'trisequential signal reproduction circuitry,' the transducer or pickup gives an output signal in the form of a frequency-modulated, trisequential color video signal together with a frequency-modulated audio or sound signal.

It is also well known that the trisequential signal reproduction circuitry is, so far as a luminance signal processing system is concerned, equipped with a VMH (vertical mixed highs) circuit, including an extra delay line cooperative with the existing two delay lines in the trisequential signal reproduction circuitry, for giving an important signal component, so-called 'vertical mixed highs,' which contributes to the vertical resolution of the reproduced picture.

The trisequential signal reproduction circuitry having the VMH circuit is currently employed in a commercially available video disc player and at least two versions thereof are known at present; one manufactured by Telefunden and Teldec, German corporations, and the other to be manufactured by Decca, a British corporation. Therefore, the present invention is not directed to the trisequential signal reproduction circuitry having the VMH circuit, but has for its essential object to provide a signal drop-out compensation circuit which can advantageously be employed in the trisequential signal reproduction circuitry having the VMH circuit and which substantially utilizes the extra delay line, constituting a component of the VMH curcuit, for compensating for the drop-out, thereby substantially avoiding the possibility of color streaks and black and white dots appearing on the picture tube.

With the above in mind, as is well known to those skilled in the art, the bottom of the information-carrier groove on the video disc has a series of hills and dales representative of modulated frequencies of the video information recorded on the video disc. Because of the structural feature of the information-carrier groove on the video disc, it has often been observed that the presence of a minute defective portion, such as fine particles of dust seating within the information-carrier groove, traces of finger prints and/or traces of scratch, in the information-carrier groove, results in the failure of the transducer to pick up the recorded information faithfully, that is, the drop-out of the recorded information picked up by the transducer.

With the known trisequential signal reproduction circuitry having the VMH circuit, since color signals are, as hereinbefore described, trisequentially modulated into the low frequency range of the luminance signal of broad bandwidth, the drop-out of the video information resulting from the transducer scanning over that defective portion of the information-carrier groove on the video disc, which drop-out continues in most cases for a period of time not exceeding the duration of one horizontal synchronizing pulse, tends to be exaggerated, as it is processed through the reproduction circuitry, to such an extent that a color signal is prolonged in duration for a certain period of time corresponding to three horizontal synchronizing pulses. Therefore, even though the drop-out of the trisequential color video signal being picked up by the transducer has occurred instantaneously, the resultant color streaks and black and white dots on the picture tube are so noticeable that the reproduced color picture may be deteriorated.

According to the present invention, if the transducer has failed to pick up one, for example, a red color signal, of the color signals red, green and blue recorded on the video disc sequentially and in line-by-line fashion, the drop-out can be compensated for by substituting for the red color signal, which has been dropped out, the same color signal of the previous trisequential cycle. For this purpose, while the delay line which forms a component of the known VMH circuit in the trisequential signal reproduction circuitry as hereinbefore described is utilized, a drop-out compensation switching circuit is employed for inserting a three-line delayed color signal into the subsequent cycle of the trisequential color signals, which switching circuit is energized in response to a trigger signal which is in turn generated by the detection of the drop-out occurring in the trisequential color signals being picked up by the transducer.

These and other objects and features of the present invention will become apparent from the following description taken in conjunction with preferred embodiments thereof with reference to the accompanying drawings, in which.

Figure 3:
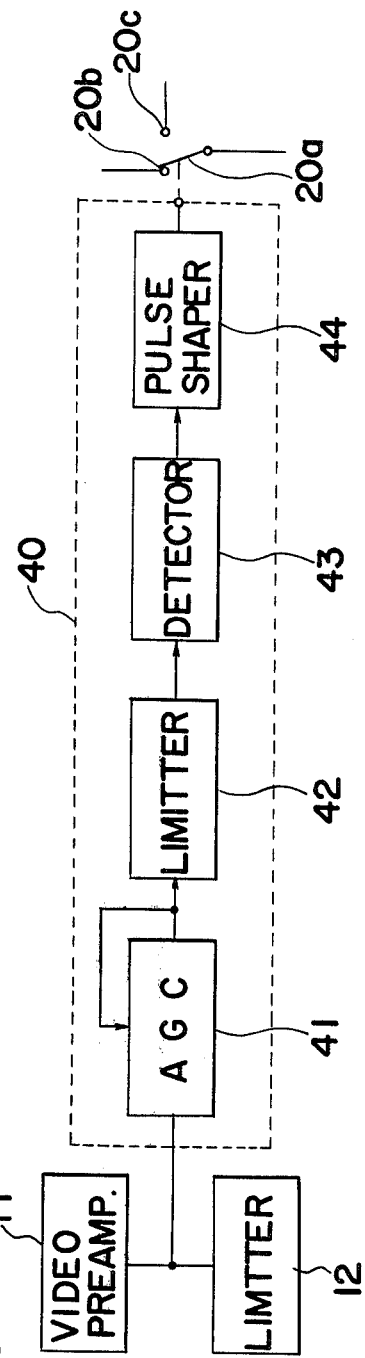
Figure 4:
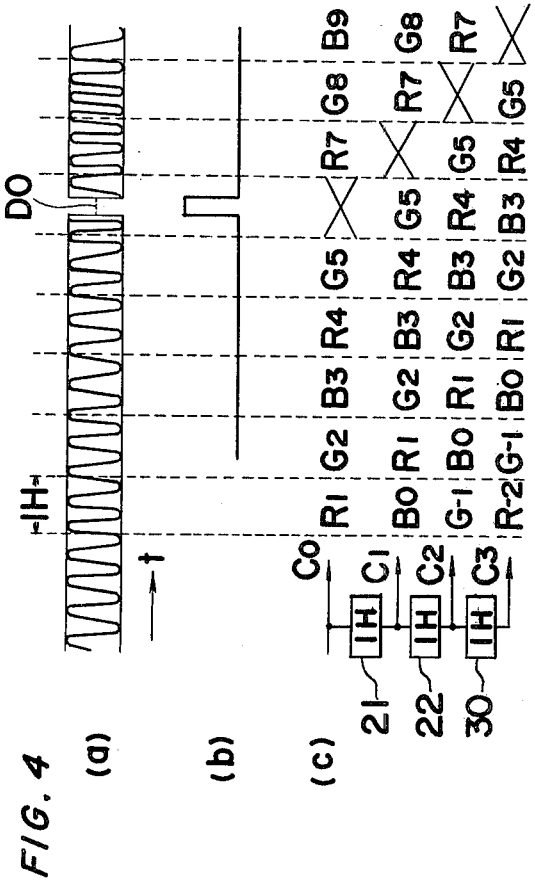

FIG. 3 is a block circuit diagram showing the construction of the drop-out compensation circuit; and FIG. 4 is a time chart showing the sequence of color signals with respect to individual delay lines, which is shown in relation to the drop-out in the frequency-modulated information being picked up by a transducer, wherein FIG. 4(a) is a waveform of the frequency modulated information being picked up by the transducer, FIG. 4(b) is a waveform of an output signal, that is, a trigger pulse, generated from a detector constituting a component of the drop-out compensation circuit, and FIG. 4(c) is a diagram showing the sequence of the color signals.

Figure 1:
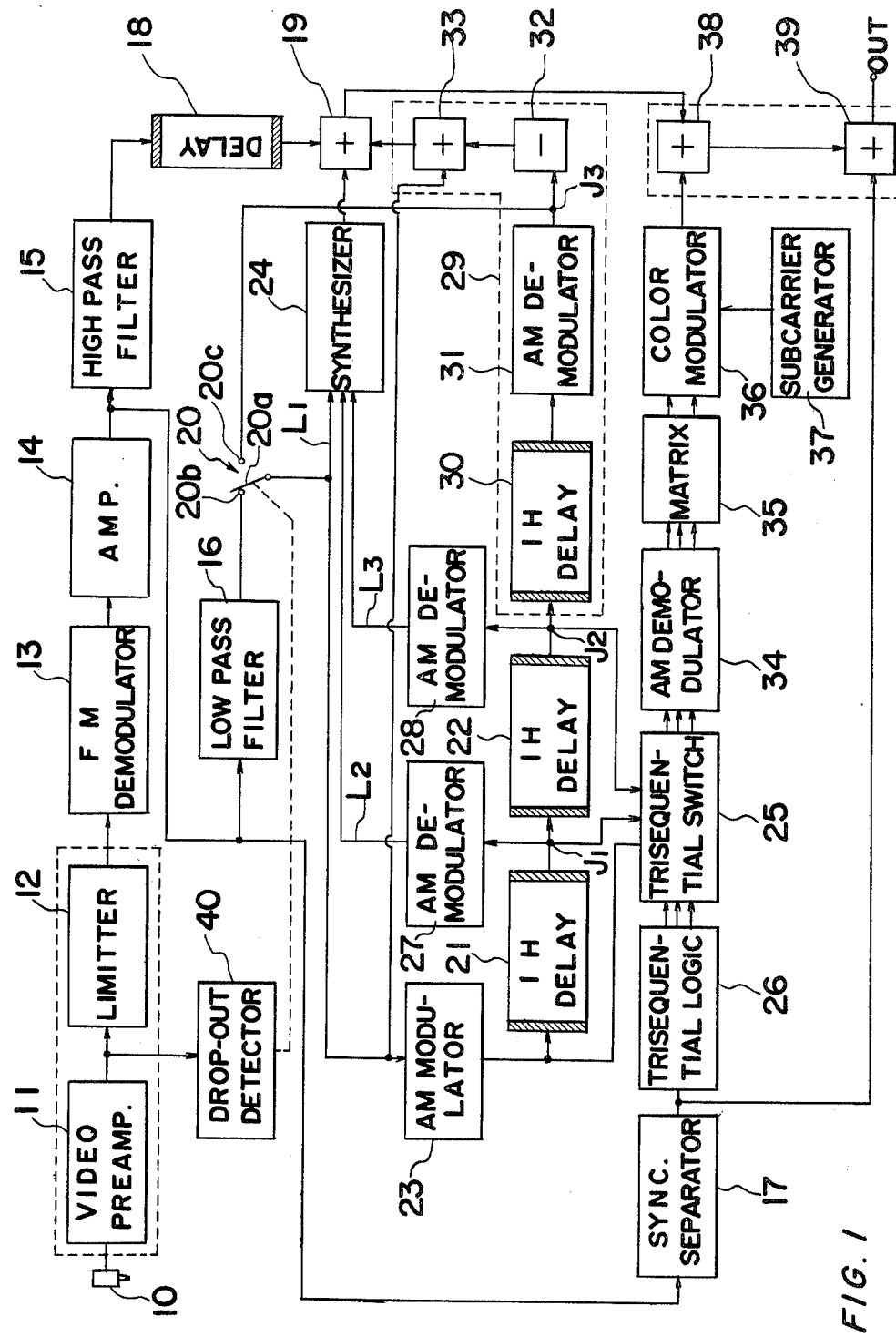
FIG. 1 is a block circuit diagram of a drop-out compensation circuit according to the present invention shown as applied in a trisequential signal reproduction circuit of a type developed by Telefunken and Teldec.

Before the description of the present invention proceeds, it is to be noted that like parts are designated by like reference numerals throughout the accompanying drawings., Referring first to FIG. 1, the frequency-modulated video information on the video disc (not shown) is picked up by a scanning pickup 10 in a known manner, which is in turn fed to a limiter circuit 12 through a video preamplifier 11. The video information thus picked up by the scanning pickup and subsequently fed to the limiter circuit 12 is in the form of a frequency-modulated sound carrier which is superimposed upon the frequency-modulated video signal having such information as synchronization, luminance and chrominance; the video signal being fed to an amplifier 14 through a FM demodulator circuit 13 and the FM sound carrier being fed to an audio signal processing circuitry (not shown).

It is to be noted that the audio signal processing circuitry does not constitute a subject matter of the present invention and may be of any known type. Therefore, the details thereof are herein omitted for the sake of brevity. In addition, it is also to be noted that, since the color signals, red, green and blue have been recorded on the video disc sequentially and in line-by-line fashion, that is, trisequentially, as hereinbefore described, these color signals carried by the video signal picked up by the pickup 10 are trisequentially fed to the amplifier 14.

The video signal emerging from the amplifier 14 is applied in shunt to a high-pass filter 15, a low-pass filter 16 and a synchronizing signal separator 17. The high-pass filter 15 allows high frequency components of a trisequential video signal to be applied through a delay line 18 to a summation circuit 19, for example, an adder, where high and low components of the luminance signal are summed together with a vertical resolution compensating signal, that is, a so-called 'vertical mixed highs,' in a manner as will be described later.

The low-pass filter 16 serves to extract from the video signal the video color signals, that is, the red, green and blue signals, which have been applied thereto sequentially and in line-by-line fashion, while the synchronizing signal separator 17 serves to extract horizontal synchronizing pulses from the same video signal applied thereto through the amplifier 14.

The low-pass filter 16 is connected through a switch 20, as will be described in detail later, to a series-connected first and second delay lines 21 and 22 by means of an AM modulator circuit 23 which is interposed between the switch 20 and the first delay line 21 for driving the delay lines 21 and 22, and also to a synthesizer 24 for synthesizing the low-frequency component of the luminance signal. The first and second delay lines 21 and 22 have identical operating characteristics and are of a type that an input signal can be delayed a time substantially equal to the duration of one horizontal synchronizing pulse.

The AM modulator circuit 23 is also connected to a synchronized sequential switch 25 which is known as a 'Tri-PAL' switch together with a trisequential logic circuit 26 with which said switch 25 is connected so as to receive logic pulses generated by said logic circuit 27 in synchronism with the horizontal synchronizing pulses applied thereto from the separator circuit 17.

A junction J1 between the first and second delay lines 21 and 22 is connected to the synthesizer 24 through an AM demodulator 27 on one hand and also to the trisequential switch 25 on the other hand and, similarly, an output of the second delay line 22 is connected to the synthesizer 24 through an AM demodulator 28 via a junction J2 on one hand and to the trisequential switch 25.

A verical resolution compensating circuit, generally indicated by 29 and which is known as a 'vertical mixed highs (VMH) circuit,' includes a third delay line 30 having an input connected to the second delay line 22 through the junction J2 and an output connected to the summation circuit 19 through an AM demodulator 31, then a subtracter 32 and finally an adder 33.

Referring to the first to third delay lines 21 22 and 30, the delay line 30 being of identical operating characteristic with any of the delay lines 21 and 22, as best shown in FIG. 4(c), while the delay line 21 receives an input signal Co composed of repeated trisequences of red, green and blue signal components lined up, for example, in the order given above, a signal appearing at the junction J1 is delayed one line period with respect to the input signal of the delay line 21 so that the blue signal component of the subsequent trisequence can be applied to the synthesizer 24 by way of a line L2 at the time the red signal component is applied thereto by way of a line L1. Similarly, the green signal component of the two-line delayed trisequence is applied to the synthesizer 24 by way of a line L3. An output pulse which emerges from the third delay line 30 at the time the red, green and blue components are simultaneously inputted to the synthesizer 24 is, as can be understood from FIG. 4(c), a red component of the three-line delayed trisequence.

The trisequential switch 25 is, upon receipt of the logic pulses from the trisequential logic circuit 26, triggered to generate red, green and blue color signals synchronized by the horizontal synchronizing pulses to those applied to the synthesizer 24, which color signals are simultaneously applied to an AM demodulator 34 which is followed by a matrix 35. The matrix 35 codes the color signals into two color difference signals which are subsequently applied to a color modulator 36.

A subcarrier of, for example, 3.58 MHz is applied from a subcarrier generator 37 to the color modulator 36 where the subcarrier is modulated by the color difference signals, which have been applied thereto from the matrix 35 through the AM demodulator 34, to give a chrominance signal to be applied to an adder 38. In the adder 38, the chrominance signal from the color modulator 36 and the luminance signal from the summation circuit 19 are combined and subsequently fed to another adder 39 which constitutes together with the adder 38 a composite video signal synthesizing circuit. By summing the chrominance signal and the luminance signal together with the composite synchronizing pulses which have been fed to the adder 39 from the synchronizing pulse separator 17, a composite video signal can be obtained at an output terminal OUT.

The output terminal OUT is in practice coupled to a composite video and audio mixer (not shown) of any known construction where the composite video signal and an audio signal, which has been processed through the audio signal processing circuit (not shown) are combined. The combined video and audio signal is applied to a television receiver (not shown) in any known manner.

It is to be noted that the circuit arrangement shown and the operation thereof are well known to those skilled in the art, because they are substantially identical to those employed in such video disc players as manufactured by Telefunken and Teldec.

The drop-out compensation circuit according to the present invention comprises, in addition to the switch 20, a drop-out detector 40 electrically coupled to a junction between the video preamplifier and the limiter 12, which detector 40 is operatively associated with said switch 20. As shown in FIG. 1, the switch 20 is shown as having one movable contact 20a, operatively associated with the drop-out detector 40, and a pair of spaced fixed contacts 20b and 20c which are respectively coupled to the low-pass filter 16 and a junction J3 between the AM demodulator 31 and the subtracter 32. The movable contact 20a is electrically coupled to the synthesizer 24 and also to the AM modulator 23.

In operation, so long as there is no drop-out in the video information emerging from the video preamplifier 11, the drop-out detector 40 is not energized so that the movable contact 20a of the switch 20 is engaged to the fixed contact 20b. During this condition, the circuit operates in the known manner.

On the other hand, when the drop-out detector 40 is energized, that is, when the drop-out detector 40 detects the presence of a drop-out DO in the video information as shown in FIG. 4(a), the movable contact 20a is moved to the fixed contact 20c in response to such detection. Assuming that the drop-out in the video information results in that one of the trisequential color signals emerging from the low-pass filter 16, for example, a blue component of the signal $C_0$ such as indicated by X in FIG. 4(c) and shown in timed relation to the timing at which the drop-out DO has occurred, becomes missing, the same color component of the output signal $C_3$, such as indicated by $B_3$ in FIG. 4(c), is applied both to the synthesizer 24 and the AM modulator 23 via the switch 20, wherein the movable contact 20a is then engaged to the fixed contact 20c, through the junction J3. After this has occurred, the movable contact 20a is automatically moved to the fixed contact 20b.

From the foregoing, it is clear that the drop-out can be compensated for by substituting for a missing color component the same color component of the trisequence three line-period earlier than the trisequence of the missing color component.

It is to be noted that automatic switching of the movable contact 20a from the fixed contact 20c to the fixed contact 20b can readily be achieved if the switch 20 is designed such as to be operated in response to a trigger pulse having a pulse duration substantially equal to a drop-out period, that is, a period in which the drop-out DO has occurred in the video information being picked up by the pickup 10. For this trigger pulse to be utilized, the switch 20 may be composed of an electronic element, such as a switching transistor, or a combination of mechanical switch and a solenoid relay.

In the instance as shown, the drop-out detector 40 comprises, as best shown in FIG. 3, a series circuit of an automatic gain control 41, a liiter 42, a detector 43 and a pulse shaper 44 arranged in the order given above. In the detector 40, the limiter 42 and the detector 43 continue generating an output signal of predetermined level so long as no drop-out occur in the video information and generates an output signal of lower level than said predetermined level upon detection of the drop-out appearing in the video information. The pulse shaper 44 on the other hand acts to discriminate whether or not the output signal from the detector 43 has a level higher or lower than a predetermined level and generates, when the output signal from said detector 43 is found to be lower than the predetermined level set to said pulse shaper 44, the trigger pulse of the aforesaid duration, such as shown in FIG. 4(b), which is necessary to operate the switch 20 in the manner as described above.

With respect to the automatic gain control 41, it may not be always necessary. However, in view of the fact that the level of the output from the preamplifier 11 varies as the pickup 10 scanning the information-carrier groove on the video disc in contact therewith progressively approaches the innermost turn of the information-carrier groove on the video disc as is well known to those skilled in the art, the employment of the automatic gain control 41 is recommended to maintain at a constant level, the level of the video information being picked up by the pickup 10 irrespective of the position of the pickup 10 relative to the information-carrier groove on the video disc.

Figure 2:
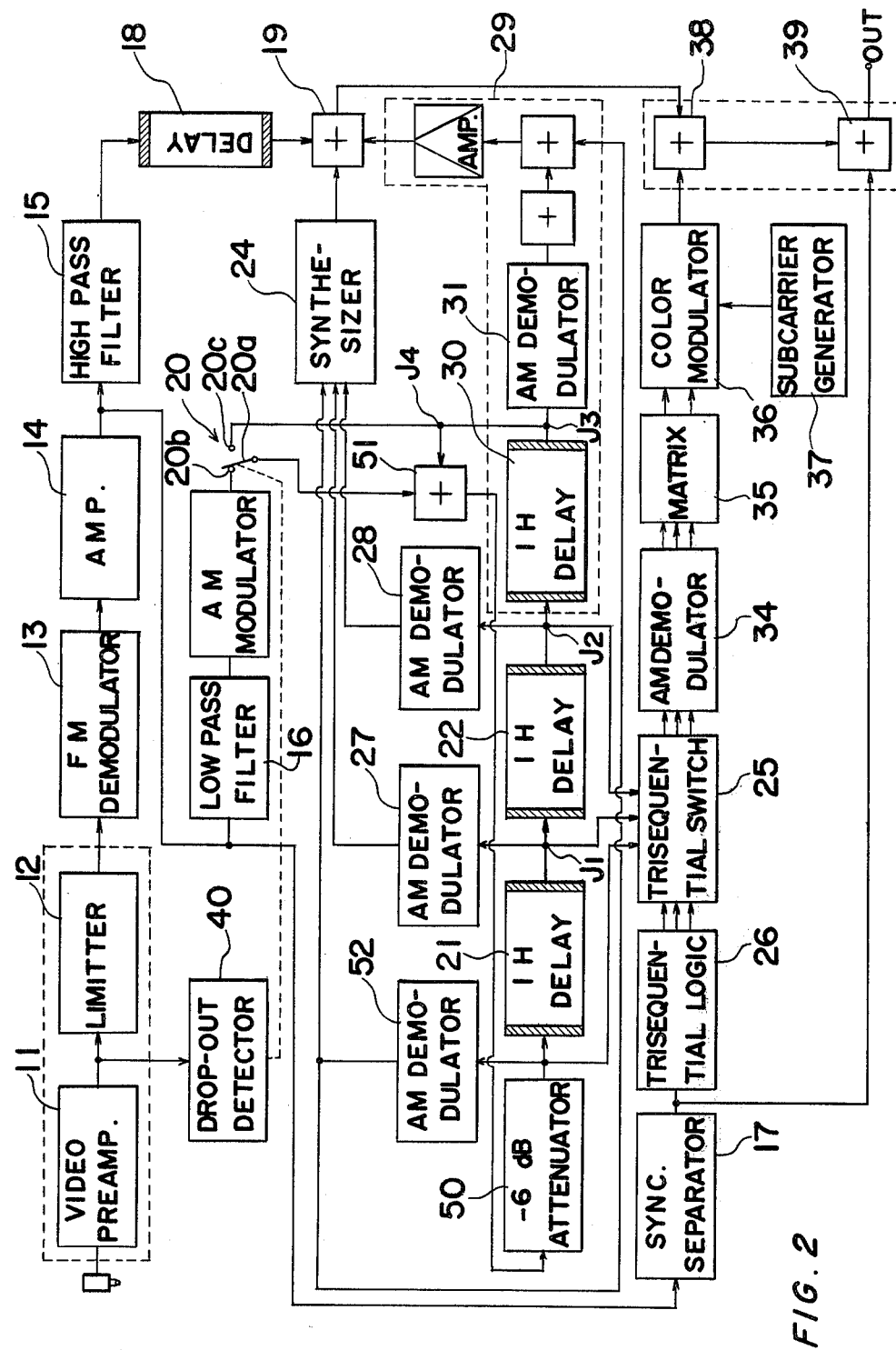
FIG. 2 is a similar diagram to FIG. 1, showing the drop-out compensation circuit as applied in a trisequential signal reproduction circuit of a type developed by Decca.

Referring now to FIG. 2, there is shown a known video information reproduction circuitry employed by Decca, to which the drop-out compensation circuit according to the present invention is inserted. The VMH circuit shown in FIG. 2 differs from that shown in FIG. 1 in that, in the VMH circuit shown in FIG. 2, a feed-back loop from the output of the third delay line 30 back to the first delay line 21 through an adder 51 via an attenuator 50 is employed. Furthermore, because of the design of the VMH circuit shown in FIG. 2, instead of the AM modulator 23 employed in the circuit of FIG. 1, an AM demodulator 52 is employed.

Even though the above described difference exists, and since the drop-out compensation circuit provided according to the present invention in the circuit of FIG. 2 is substantially identical in construction and operation to that employed in the circuitry of FIG. 1, the circuitry of FIG. 2 satisfactorily functions in a substantially similar manner to that of FIG. 1.

Although the present invention has been fully described by way of example with reference to the accompanying drawings, it is to be noted that various changes and modifications are apparent to those skilled in the art. For example, depending upon the construction of the detector 40, it may be coupled to the output of the low-pass filter 16. Therefore, such changes and modifications are to be understood as included within the true scope of the present invention unless they depart therefrom.

What is claimed is:

1. In a video information reproduction circuitry for use in a video disc player of a type utilizing a combination of a flexible foil-type video disc having at least one surface formed with a spirally extending information-carrier groove and a transducer adapted to be slidingly engaged in said information-carrier groove on said video disc during reproduction of video information, said reproduction circuitry comprising means for detecting at least frequency-modulated video information being picked up by said transducer, said frequency-modulated video information including a luminance signal and a trisequential color signal superimposed sequentially and in line-by-line fashion upon low-frequency components of said luminance signal; means for separating said frequency-modulated video information into high and low components of said luminance signal; first and second delay circuits connected in series with each other; means coupled to said separating means, said first delay circuit and said second delay circuit for simultaneously receiving different color components included in said trisequential color signal and generating a synthesized output signal; means for summing the low and high frequency components of the luminance signal to give a complete luminance signal; a trisequential switching circuit coupled to receive said different color components included in said trisequential color signal simultaneously and for generating color difference signals; means for preparing a chrominance signal upon receipt of said color difference signal; means for preparing a composite video signal by the summation of said chrominance signal and said complete luminance signal, which composite video signal being adapted to be reproduced by a television receiver; and a vertical resolution compensating circuit including a third delay line coupled to said second delay line for delaying one line period the trisequential color signal which has been delayed one line period by said first delay circuit and another one line period by said second delay circuit, thereby providing color components outputted in the same sequence as that of the color components emerging from said separating means, and means for applying a difference signal to said simultaneously receiving means, said difference signal being indicative of the difference in level between said trisequential color signal of one cycle and that of the next succeeding cycle, the improvement which comprises a drop-out compensation circuit including means for detecting the presence of a drop-out in said video information being picked up by said transducer, said detecting means generating a trigger signal of a duration substantially equal to a drop-out period in response to the presence of said drop-out in said video information, and a switching means for interrupting the passage between said separating means and said simultaneously receiving means and first delay circuit and, at the same time, completing a loop from said third delay line back to said first delay circuit, in response to and during the duration of said trigger signal for applying one portion of the color components of the trisequential color signal, which has been omitted by the drop-out in the video information, to said simultaneously receiving means and also to said switching means.

2. A video information reproduction circuitry as claimed in claim 1, wherein said switching means have a movable contact operatively associated with said dropout detecting means and a pair of fixed contacts, one of said fixed contacts being coupled to said separating means and the other of said fixed contacts being coupled to said third delay line, said movable contact being coupled to said simultaneously receiving means and also to said first delay circuit and normally engaged to said one fixed contact, said movable contact being engaged to said other of said fixed contacts in response to and during the duration of said trigger signal.

3. A video information reproduction circuitry as claimed in claim 2, wherein said drop-out detecting means includes an automatic gain control for maintaining at a substantially constant level the level of the video information being picked up by said transducer irrespective of the position of said transducer relative to the video disc information-carrier groove.

* * * * *